Patented May 24, 1932

1,860,154

UNITED STATES PATENT OFFICE

BIRGER W. NORDLANDER, OF SCHENECTADY, NEW YORK, ASSIGNOR TO GENERAL ELECTRIC COMPANY, A CORPORATION OF NEW YORK

STABLE SELENIUM SULPHIDE AND METHOD FOR ITS PREPARATION

No Drawing.   Application filed March 28, 1929.   Serial No. 350,836.

The present invention is a continuation in part of my copending application Serial No. 82,883, filed January 21, 1926, now Patent #1,711,742, granted May 7, 1929, and relates to a stable, chemically active compound of selenium sulphide and the process of preparing the same.

In the above named copending application I described a means for detecting mercury vapor in a gas by the use of selenium sulphide. In that case I also set forth several methods of preparing this compound. I have found that selenium sulphide is of wide and general application and has many uses, among which may be mentioned its use as an insecticide and fungicide, and as a therapeutic agent in certain skin diseases.

As far as I am aware, selenium sulphide as a stable compound of definite composition has never before been prepared. A few attempts have been made, to my knowledge, to produce stable selenium sulphide of definite composition, but no satisfactory results were obtained. For example, it has been found that when hydrogen sulphide is passed into a solution of selenious acid, a yellow sol and a precipitate of a yellowish red color, having a plastic consistency are formed together. Complete reaction does not seem to occur since the solution formed always contains unchanged selenious acid no matter how long the hydrogen sulphide is allowed to act. The precipitate is very voluminous and much of the acid solution is adsorbed. In this plastic form the precipitate is very unstable, especially when heated or exposed to light and is chemically not active.

I have succeeded in preparing selenium sulphide of a definite composition corresponding to the formula $SeS_2$ which is stable chemically and chemically extremely active. Such a product has been kept for years without losing its activity.

One method of preparing this compound is as follows:

A solution of aluminum chloride containing about 100 milligrams of aluminum per liter is saturated with hydrogen sulphide at room temperature, preferably in a flask that is partly closed in order to retain an atmosphere of the gas above the liquid and thus promote its absorption by the solution during the reaction. Vigorous mechanical stirring is also desirable for the same purpose. While continuing the current of hydrogen sulphide, normal selenious acid solution is slowly added delivering below the surface of the liquid in the flask. At first a yellowish sol is formed which very soon, as the concentration increases, is converted to a yellow flocculent precipitate which readily separates out from the solution. A moderate temporary excess of the acid will form a sol which quickly clears up if the addition is stopped for the time. The operation should be carefully watched to keep the hydrogen sulphide in excess. The aluminum chloride acts as a coagulant for the sulphide. Other coagulants may be used for the same purpose, and as an example, barium chloride may be mentioned. The reaction proceeds quantitatively according to the formula

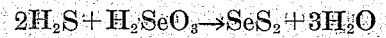
$$2H_2S + H_2SeO_3 \rightarrow SeS_2 + 3H_2O$$

The precipitate is filtered, washed and dried. It is a fine yellow powder and can be dried on a steam bath without turning red.

In accordance with another method of preparing this compound of selenium sulphide, sulphur and selenium are mixed together in the proportion of one molecular weight of selenium to two molecular weights of sulphur, and the mixture heated to about 225° C. A union takes place so that a cherry red melt of selenium sulphide $SeS_2$ is formed. When cooled down to room temperature it forms a black plastic mass, plastic in character like rubber. It will retain this condition for several days, but will then gradually go over into a hard brittle state so that it can be ground up to form an orange red powder with a melting point of about 100° C. This conversion is accelerated by heat and if the mass is kept just below the melting point, say about 80 to 90° C., a conversion takes place in a considerably shorter period of time, about half an hour. The plastic form is inactive but the heat treatment changes it over to the active form.

Selenium sulphide prepared by either of these methods is stable and chemically active and is always of definite composition. If, in the second method outlined above, other proportions of selenium and sulphur are used, the resulting powder will be a mixture of stable, chemically active selenium sulphide in an excess of sulphur or selenium, as the case may be.

The term "stable" herein applied to the selenium sulphide produced in accordance with the present invention denotes that the compound is stable to such agencies as heat and light and denotes also that the product of the present invention is not decomposed by such agencies but retains its composition, that is the sulphur and selenium remain chemically combined having the composition represented by the formula $SeS_2$.

The term "chemically active" as applied to the selenium sulphide produced by the present invention denotes that the compound is reactive chemically with substances with which ordinary mixtures of selenium and sulphur or compositions of selenium and sulphur not prepared by the methods of the present invention are substantially not reactive.

What I claim as new and desire to secure by Letters Patent of the United States, is:

1. Stable, chemically active selenium disulphide.

2. A selenium sulphide having the chemical composition represented by the formula $SeS_2$, which is stable to light and heat and is chemically active to mercury vapor.

3. A compound consisting of selenium and sulphur in stable combination, said compound being chemically active and having the formula $SeS_2$.

4. The method of producing stable, chemically active selenium disulphide which comprises the steps of treating a solution of hydrogen sulphide in excess with selenious acid.

5. The method of producing stable selenium disulphide which comprises the steps of precipitating the selenium sulphide with selenious acid from a solution containing hydrogen sulphide in excess and in the presence of a coagulant.

6. The method of producing stable selenium disulphide which comprises the steps of treating a solution of hydrogen sulphide in excess and which contains aluminum chloride, with selenious acid, and separating the precipitate formed.

7. The method of producing stable chemically active selenium disulphide which consists in treating a solution of hydrogen sulphide containing aluminum chloride as a coagulant, with selenious acid, to precipitate the selenium sulphide, the hydrogen sulphide being kept in excess, removing the precipitate so formed, washing and drying the same.

In witness whereof I have hereunto set my hand this 27th day of March, 1929.

BIRGER W. NORDLANDER.